UNITED STATES PATENT OFFICE.

EDWARD FOSTER, OF AUCKLAND, NEW ZEALAND.

COMPOSITION FOR ATTACHING INSULATION TO STEAM-BOILERS AND OTHER APPLIANCES.

1,019,776.  Specification of Letters Patent.  Patented Mar. 12, 1912.

No Drawing.  Application filed April 13, 1910.  Serial No. 555,292.

*To all whom it may concern:*

Be it known that I, EDWARD FOSTER, subject of the King of Great Britain, residing at Auckland, in the Dominion of New Zealand, have invented a new and useful Improved Composition for Attaching Insulation to Steam-Boilers and other Appliances; and I do hereby declare the following to be a full, clear, and exact description of the same.

This invention has been devised in order to provide a non-corrosive composition or paint for use in securing insulating materials upon the surfaces of steam boilers, steam pipes or other appliances. The composition devised provides for the layer of insulation, such for instance as asbestos lagging, being placed on the surface to be covered, while such surface is hot. This property of the adhesive composition permits of the insulation being placed upon the steam pipes or boilers while they are in use and thereby effects a considerable saving of time. The composition devised for this purpose consists in a combination of silicate of soda, asbestos pulp, vegetable or animal oil and a suitable alkali, dissolved in water. The alkali employed may be caustic soda, pearl ash, or other chemical having similar properties.

The proportions of the ingredients may be varied to suit different circumstances, but the best results are obtained by employing the following relative amounts, viz:—Silicate of soda 40 lbs., asbestos pulp 2 lbs., vegetable or animal oil ¾ lb., alkali ¾ lb., water 10 gallons.

The composition is prepared by first mixing the oil and the alkali dissolved in water together. This is then allowed to remain for about 12 hours. The silicate of soda is then dissolved in hot water and the mixture of the oil and alkali and the asbestos pulp are added to it. The required quantity of water is then added and the whole thoroughly mixed together. The composition thus produced is spread over the surface to be insulated by any suitable means and the insulating material then plastered on to it either with a trowel or by hand so that it will adhere to the surface.

What I do claim as my invention, and desire to secure by Letters Patent is:—

A composition for attaching insulation to steam boiler and other surfaces, consisting in a mixture of forty pounds of silicate of soda, two pounds of asbestos pulp, three quarters of a pound of oil, three quarters of a pound of an alkali and ten gallons of water, substantially as specified.

Dated this 11th day of March 1910.

In testimony whereof, I have signed this specification in the presence of two subscribing witnesses.

EDWARD FOSTER.

Witnesses:
E. BROOKE SMITH,
E. F. COURTNEY.